United States Patent [19]
Prater

[11] Patent Number: 6,007,430
[45] Date of Patent: Dec. 28, 1999

[54] TWO-PIECE CARRIER ASSEMBLY

[75] Inventor: Ronald E. Prater, Rochester, Mich.

[73] Assignee: Koppy Corporation, Orion, Mich.

[21] Appl. No.: 08/946,771

[22] Filed: Oct. 8, 1997

[51] Int. Cl.⁶ ........................................ F16C 1/26
[52] U.S. Cl. ............................ 464/170; 403/375; 74/609
[58] Field of Search ...................... 464/170, 177, 464/183, 185; 74/608, 609; 403/335, 375

[56] References Cited

U.S. PATENT DOCUMENTS

| | | | |
|---|---|---|---|
| 2,262,975 | 11/1941 | Strachovsky | 464/170 |
| 2,547,734 | 4/1951 | Barager | 464/170 |
| 3,631,947 | 1/1972 | Laing . | |
| 3,782,355 | 1/1974 | Hamman . | |
| 4,603,555 | 8/1986 | Mayer | 74/609 |
| 4,707,034 | 11/1987 | Gerstner et al. . | |
| 4,868,963 | 9/1989 | Carsmeier et al. | 403/335 |
| 4,890,948 | 1/1990 | Bondioli | 464/170 |
| 5,267,807 | 12/1993 | Biedermann et al. | 403/375 |
| 5,498,104 | 3/1996 | Gray | 403/335 |

FOREIGN PATENT DOCUMENTS

| | | | |
|---|---|---|---|
| 9325943A1 | 1/1989 | European Pat. Off. . | |
| 2466353 | 10/1980 | France . | |
| 515424 | 1/1931 | Germany | 464/170 |
| 19543436A1 | 5/1997 | Germany . | |
| 2045392 | 10/1980 | United Kingdom | 464/170 |
| 2282786A | 10/1993 | United Kingdom . | |

*Primary Examiner*—Eileen Dunn Lillis
*Attorney, Agent, or Firm*—Howard & Howard

[57] ABSTRACT

A carrier made up of two housings includes a plurality of drive members that facilitate transferring a driving force between the two housings. When the carrier is used in a vehicle transmission, for example, the two housings preferably include generally cylindrical wall portions. A plurality of lanced drive members are formed on each of the housings. The two housings are interconnected so that the drive members on the first housing engage the drive members on the second housing and a rotary force imposed on one of the housings is transferred to the other.

20 Claims, 2 Drawing Sheets

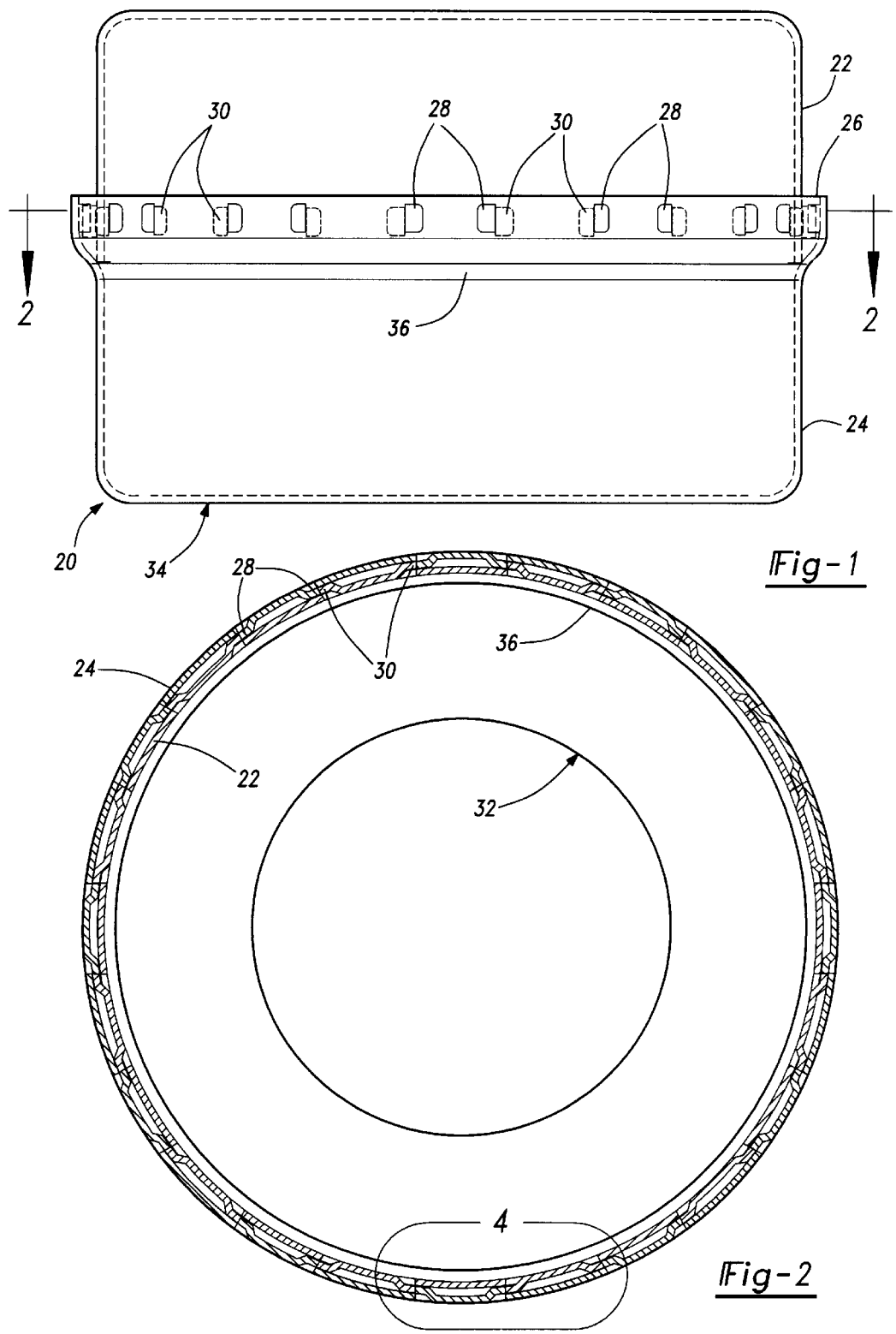

6,007,430

1

TWO-PIECE CARRIER ASSEMBLY

BACKGROUND OF THE INVENTION

This invention generally relates to a two-piece drive assembly where a drive force is transferred from one piece to the other.

Drive members are used in a variety of applications. In vehicle transmissions, for example, two opened ended cylindrical housings are sometimes used to form a transmission drive member. Such housings typically have a generally cylindrical configuration with at least one open end. The open ends typically include interspaced tangs and grooves. The tangs are circumferentially spaced along the edge of each housing at the open end. The two housings are connected together by interlocking the tangs on one housing with the tangs on the other. In other words, the tangs of one housing fit into grooves formed on the other. Although such an arrangement is useful for some applications, it is not without problems.

Forming intermixed tangs and grooves at the edge of a cylindrical housing requires removing a portion of the material. Such housings are typically made of steel. Removing portions of the steel at the open end of each housing tends to weaken the integrity of the housing. Moreover, the housings typically rotate at relatively high speeds. High speed rotation introduces centrifugal forces that urge the tangs outward. Because parts of the material have been removed and the centrifugal forces become significant, the tangs bend outward away from the center of the housing. Eventually, one or more of the tangs can become so deformed that the two-piece unit moves out of the desired alignment.

Therefore, it is desirable to provide an improved carrier assembly that can be used as a transmission drive member, for example. This invention provides such an assembly and overcomes the shortcomings and drawbacks associated with the prior attempts.

SUMMARY OF THE INVENTION

In general terms, this invention is a carrier made up of two housings that each include a series of lanced drive members that permit a rotary force on one housing to be transferred to the other housing so the two rotate together.

A housing designed according to this invention includes a wall portion that has a thickness defined between an inner surface and an outer surface. The wall portion extends between two ends on the housing. At least one of those ends is open. The housing includes a plurality of lanced drive members formed in the wall portion near the open end. The drive members each have a forward edge that extends away from one of the wall portion surfaces in a generally perpendicular direction relative to that surface. For example, the drive members may extend radially inward and the forward edge is generally perpendicular to the inner surface of the wall portion. The forward edge preferably is generally flat and faces in a direction that is aligned with a driving force that is imposed on the housing. Each forward edge is adapted to engage a corresponding driving surface on another housing so that the force imposed on the one housing results in corresponding movement of the other housing.

The various features and advantages of this invention will become apparent to those skilled in the art from the following detailed description of the presently preferred embodiment. The drawings that accompany the detailed description can be described as follows.

BRIEF DESCRIPTION OF THE DRAWINGS

FIG. 1 is a diagrammatic illustration of a carrier assembly designed according to this invention.

FIG. 2 is a cross-sectional illustration taken along the lines 2—2 from FIG. 1.

DETAILED DESCRIPTION OF THE PREFERRED EMBODIMENT

Figure 3:
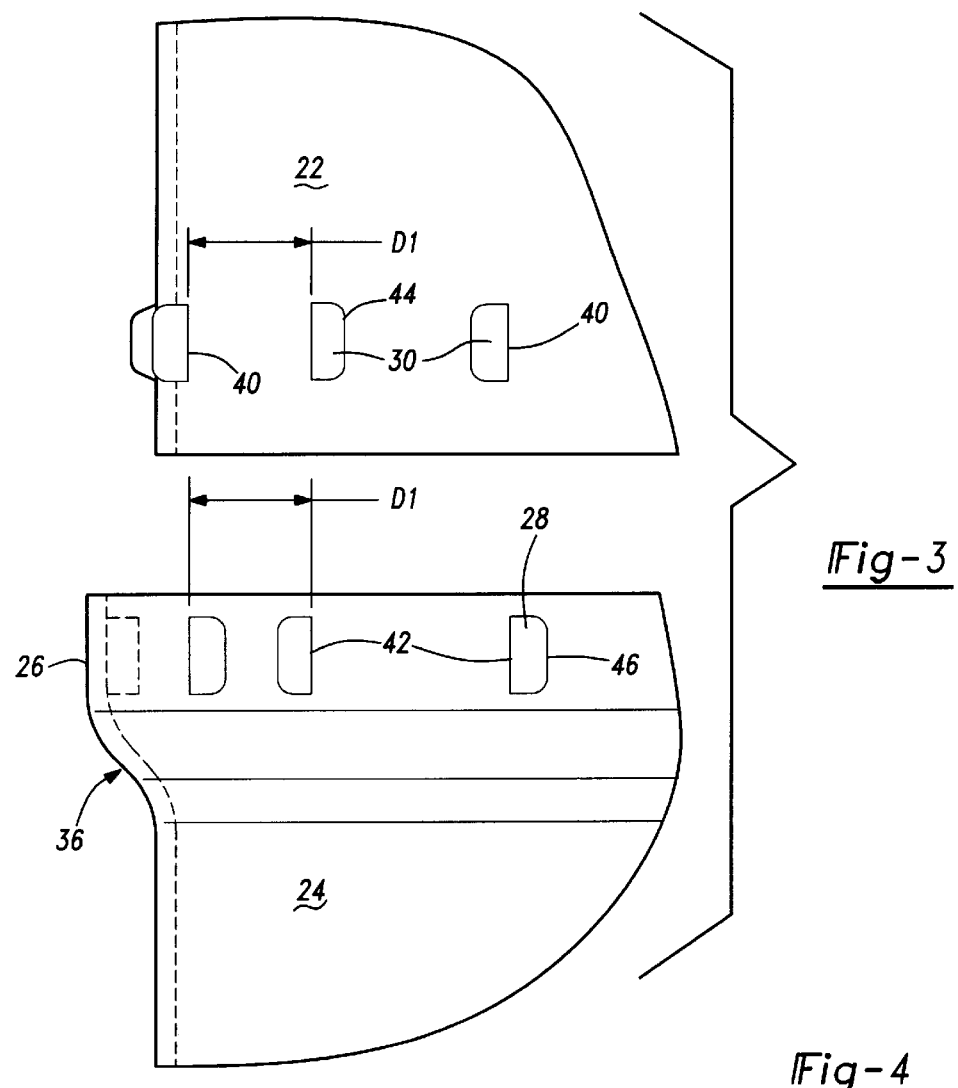
FIG. 3 is a diagrammatic illustration of selected portions of the embodiment of FIG. 1.

FIG. 1 illustrates a carrier assembly 20 that includes a first housing 22 and a second housing 24. Each of the housings preferably has a generally cylindrical wall portion that extends between two ends of the housing. The wall portions preferably are made of metal and have an uniform thickness.

Each housing preferably has at least one open end. As can best be seen in FIGS. 1 and 3, the second housing 24 includes a flare portion 26 that has an inner diameter that is larger compared to the remainder of the second housing 24. The flare portion 26 receives at least a part of the first housing 22 when the two housings are interconnected. The second housing 24 preferably includes a plurality of drive members 28 that are formed on the flare portion 26. The drive members 28 interact with drive members 30 that are formed on the first housing 22 near the open end of the first housing. As best shown in FIG. 2, the most preferred embodiment includes a series of circumferentially spaced drive members around the entire periphery of each housing. Alternatively, far fewer drive members could be used. Further, an unequal number of drive members could be provided on each housing so long as there are corresponding drive members on each housing that serve to interconnect the two housings in a manner that allows a drive torque imposed on one housing to be transferred to the other.

The second housing 24 includes an opening 32 at a lower end 34 (according to the drawing). The generally cylindrical wall portion preferably includes a constant diameter in the portion that extends between the lower end 34 and the flare portion 26. At the location where the flare portion merges with the remainder of the wall portion of the second housing 24, a generally circumferential ledge 36 is formed. The ledge 36 is useful for facilitating a proper placement of the first housing 22 within the second housing 24. As can be appreciated from the drawings, a terminal edge on the open end of the first housing 22 will be received against the ledge portion 36 on the second housing 24. When the first housing 22 is interconnected with the second housing 24, the drive members interact in a way so that a rotary force imposed on one housing results in a corresponding rotation of the other housing.

Figure 4:
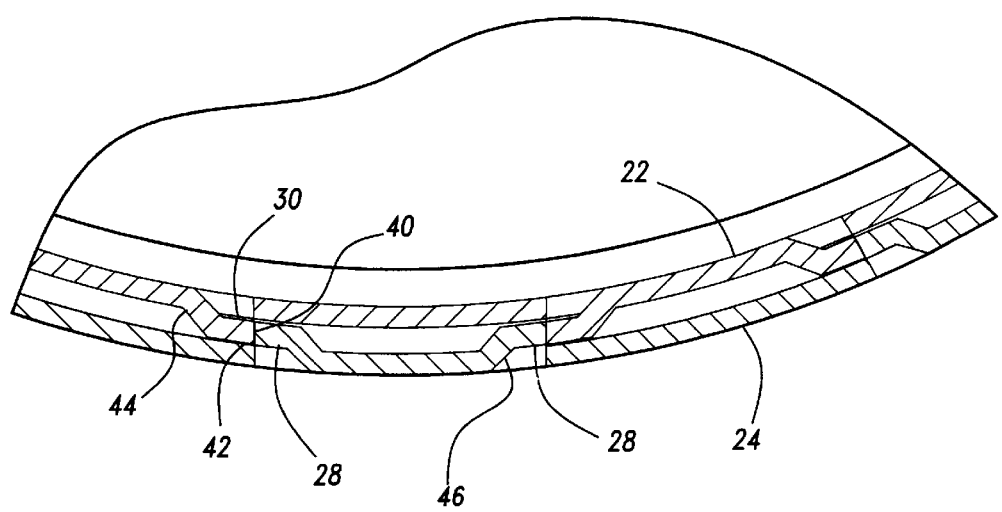
FIG. 4 is an expanded view of a portion of the illustration of FIG. 2.

As best seen in FIGS. 2, 3 and 4, the drive members 28 on the second housing 24 are lanced and protrude radially inward from the inner surface of the flare portion 26. The drive members 30 on the first housing 22 are lanced and protrude from the outer surface of the first housing 22. Utilizing lanced drive members instead of tangs and grooves results in a much stronger carrier assembly. Because the end of each housing has a continuous periphery, there is no longer the possibility for centrifugal forces to cause an outward distortion of the material when the carrier assembly is in use. Using lanced drive members provides the further advantage of not requiring the removal of any of the material (i.e., metal) from either housing.

The drive members 30 include a front edge 40, which preferably is generally flat and extends in a generally perpendicular direction radially away from the outer surface of the first housing 22. Similarly, the drive members 28 include front edges 42, which preferably are generally flat and extend in a generally perpendicular direction radially inward from the inner surface of the second housing 24. As best seen in FIG. 4, the front edges 40 on the drive members 30 are placed in abutting engagement with the front edges 42 on the drive members 28 when the two housings are interconnected. In the preferred embodiment opposing front edges 40 are spaced apart by a distance indicated as D1 in FIG. 3. Corresponding front edges 42 on the drive members 28 are also spaced apart by the distance D1. Maintaining equal spacing as illustrated provides the advantage of having a snug fit between the drive members of the two housings. Further, there is no relative rotary movement between the first housing 22 and the second housing 24 when the two are properly interconnected.

Each of the drive members 30 includes a rear edge 44 opposite the front edge 40. The rear edge 44 tapers into the outer surface on the housing 22. Similarly, a rear edge 46 on each of the drive members 28 tapers into the inner surface on the second housing 24.

The front edges on the drive members 28 have a height that is determined by the distance between a terminal edge on the drive member and the inner surface of the second housing 24. Similarly, each front edge 40 on the drive members 30 has a height that is measured between a terminal edge on the drive member and the outer surface of the first housing 22. In the preferred embodiment, the height of the front edges of all the drive members is approximately equal to the thickness of the material that makes up the generally cylindrical wall portions of the housing. This is accomplished by lancing the drive members into the housings by moving a portion of the material a distance equal to the thickness of the material. This feature can best be seen in FIG. 4.

The preferred method for making a carrier assembly designed according to this invention is accomplished in several basic steps. First, the housings are formed to have the generally cylindrical wall portions with inner surfaces defining the inner diameters and outer surfaces defining the outer diameters of each housing. In the case of the first housing 22, the drive members are then lanced using a conventional lancing tool arrangement to form the radially outwardly projecting drive members 30. In the case of the second housing 24, the flared portion 26 preferably is formed prior to forming the drive members. The drive members 28 are then formed, using a conventional lancing tool, so that they project radially inward. After the housings are appropriately fitted with internal or external components, depending on the desired application, the two open ends of the housings are interconnected so that the open end of the first housing 22 is received by the flare section 26 and the drive members 28 engage the drive members 30. The two housings can be maintained in axial alignment in a conventional manner.

The foregoing description is exemplary rather than limiting in nature. Variations and modifications to the disclosed embodiment may become apparent to those skilled in the art that do not necessarily depart from the purview and spirit of this invention. Therefore, the following claims must be studied to determine the legal scope of protection granted to this invention.

What is claimed is:

1. A housing for use in transferring a driving force to a driven component, comprising:

a wall portion extending between two housing ends, forming a closed periphery, and having a thickness defined between an inner surface and an outer surface, said wall portion including a plurality of lanced drive members formed in said wall portion and spaced about said closed periphery near one of said ends, said drive members each including a forward edge that extends away from one of said surfaces in a generally perpendicular direction relative to said one surface and a rear edge, each said forward edge being generally flat and facing in a direction that is aligned with the driving force, such that each said forward edge is adapted to engage a corresponding driven member on said driven component.

2. The housing of claim 1, wherein said drive members extend away from said inner surface toward an inside of said wall portion.

3. The housing of claim 1, wherein said drive members extend away from said outer surface toward an exterior of said wall portion.

4. The housing of claim 1, wherein said wall portion is generally cylindrical and said one end is an open end.

5. The housing of claim 4, wherein said drive members extend radially inward from said inner surface.

6. The housing of claim 4, wherein said drive members extend radially outward from said outer surface.

7. The housing of claim 1, wherein said plurality of drive members includes a first plurality of first drive members, and a second plurality of second drive members, said first plurality of first drive members each having said forward edge facing in a first direction and said second plurality of second drive members each having a forward edge facing in a second direction that is opposite said first direction and wherein said first plurality of first drive members are interspersed among said second plurality so that a rear edge on each said second drive member is facing a rear edge on an adjacent first drive member and a forward edge on each said second drive member is facing a forward edge on an adjacent first drive member.

8. The housing of claim 1, wherein each said drive member front edge has a height taken from an intersection point between said one surface and a terminal surface on said drive member and wherein said height is approximately equal to said thickness of said wall portion.

9. The housing of claim 1, wherein said rear edge of each drive member is generally tapered into said one surface.

10. The housing of claim 1, wherein each said drive member is formed in said wall portion without removing any material from said wall portion.

11. A carrier assembly, comprising:

a first housing having a generally cylindrical wall portion with an inner surface defining an inner diameter and an outer surface defining an outer diameter, said wall portion having a thickness extending between said inner and outer diameters, said wall portion terminating at an open end and including a plurality of lanced drive members formed near said open end, said drive members each including a forward edge that generally extends radially away from said outer surface;

a second housing having a generally cylindrical wall portion with an inner surface defining a nominal inner diameter and an outer surface defining a nominal outer diameter, said second housing wall portion having a thickness extending between said inner and outer diameters of said second housing, said second housing wall portion terminating at an open end, said second housing open end including a flared section extending axially from said second housing open end along a preselected length of said second housing wall portion, said flared section having an inner surface defining a flared section inner diameter that is greater than said nominal inner diameter and greater than said first housing outer diameter, said second housing including a plurality of lanced drive members formed in said flared section near said second housing open end, said second housing drive members each including a forward edge that generally extends radially inward from said flared section inner surface; and wherein said first housing open end is received by said flared section such that said front edges on said first housing drive members face corresponding forward edges on said second housing drive members so that a rotary driving force is transferred between said first and second housings by engagement of corresponding drive members.

12. The carrier assembly of claims 11, wherein said first housing drive members forward edges extend radially outward in a generally perpendicular direction relative to said first housing outer surface and said second housing drive members forward edges extend radially inward in a generally perpendicular direction relative to said flared section inner surface.

13. The carrier assembly of claim 11, wherein said forward edges are generally flat and wherein said drive members each have a rear edge that is tapered into the corresponding surface on said housings.

14. The carrier assembly of claim 11, wherein said forward edges on said first housing drive members each have a height defined between an intersection point between said forward edge and said first housing outer surface and a terminal point on said edge and wherein said height is approximately equal to said thickness.

15. The carrier assembly of claim 11, wherein said flared section has a thickness defined between said flared section inner surface and said flared section outer surface and wherein said second housing drive member front edges have a height defined between and intersection point between said forward edge and said flared section inner surface and a terminal point on said edge and wherein said height is approximately equal to said flared section thickness.

16. The carrier assembly of claim 11, wherein said flared section has an outer diameter that is greater than said nominal outer diameter.

17. The carrier assembly of claim 11, wherein said first housing inner diameter is approximately equal to said nominal inner diameter and wherein said first housing outer diameter is approximately equal to said nominal outer diameter.

18. The carrier assembly of claim 11, wherein said plurality of said drive members on said first housing includes a first plurality of first drive members and second plurality of second drive members, said first plurality of first drive members each having a forward edge facing in a first direction and said second plurality of second drive members each having a forward edge facing in a second direction that is opposite said first direction and wherein said first plurality of first drive members are circumferentially interspersed among said second plurality so that a rear edge on each said second drive member is facing a rear edge on an adjacent first drive member and a forward edge on each said second drive member is facing a forward edge on an adjacent first drive member.

19. The carrier assembly of claim 18, wherein said plurality of drive members on said second housing includes a third plurality of third drive members and fourth plurality of fourth drive members, said third plurality of third drive members each having said forward edge facing in said first direction and said fourth plurality of fourth drive members each having a forward edge facing in said second direction and wherein said third plurality of third drive members are circumferentially interspersed among said fourth plurality so that a rear edge on each said fourth drive member is facing a rear edge on an adjacent third drive member and a forward edge on each said fourth drive member is facing a forward edge on an adjacent third drive member and wherein at least one of said first drive members front edge engages at least one of said fourth drive members front edge and at least one of said second drive members front edge engages at least one of said third drive members front edge.

20. The carrier assembly of claim 19, wherein each said front edge on said first housing drive members are approximately equally circumferentially spaced apart from each other and wherein each said front edge on said second housing drive members are approximately equally spaced apart from each other such that all of said front edges on each said housing are in facing engagement with a corresponding front edge on the other said housing.

* * * * *